US010477526B2

(12) United States Patent
Chendamarai Kannan et al.

(10) Patent No.: US 10,477,526 B2
(45) Date of Patent: Nov. 12, 2019

(54) UPLINK PROCEDURES ON A SHARED COMMUNICATION MEDIUM

(71) Applicant: QUALCOMM Incorporated, San Diego, CA (US)

(72) Inventors: Arumugam Chendamarai Kannan, San Diego, CA (US); Chirag Sureshbhai Patel, San Diego, CA (US); Tao Luo, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/617,697

(22) Filed: Jun. 8, 2017

(65) Prior Publication Data
US 2017/0359815 A1 Dec. 14, 2017

Related U.S. Application Data

(60) Provisional application No. 62/350,698, filed on Jun. 15, 2016, provisional application No. 62/349,599, (Continued)

(51) Int. Cl.
H04W 72/04 (2009.01)
H04L 5/00 (2006.01)
(Continued)

(52) U.S. Cl.
CPC ....... *H04W 72/0413* (2013.01); *H04L 1/1822* (2013.01); *H04L 1/1854* (2013.01);
(Continued)

(58) Field of Classification Search
CPC ........... H04W 72/0413; H04W 72/042; H04W 72/0446; H04W 16/14; H04W 72/082;
(Continued)

(56) References Cited

U.S. PATENT DOCUMENTS

2013/0176952 A1* 7/2013 Shin .................. H04L 5/001
370/329
2016/0014810 A1* 1/2016 Tabet .................. H04B 7/0626
370/329
(Continued)

FOREIGN PATENT DOCUMENTS

EP 2398181 A2 12/2011
WO 2015027139 A2 2/2015
(Continued)

OTHER PUBLICATIONS

International Search Report and Written Opinion—PCT/US2017/036969—ISA/EPO—dated Sep. 14, 2017.

*Primary Examiner* — Rownak Islam
(74) *Attorney, Agent, or Firm* — Muncy, Geissler, Olds & Low

(57) ABSTRACT

The present disclosure relates generally to uplink procedures on a shared communication medium. In an aspect, an access terminal receives a downlink subframe from an access point on the shared communication medium and, in response to receiving the downlink subframe, transmits uplink control information (UCI) for the downlink subframe on a first uplink subframe of a first UCI channel of a plurality of UCI channels.

24 Claims, 10 Drawing Sheets

Related U.S. Application Data filed on Jun. 13, 2016, provisional application No. 62/348,715, filed on Jun. 10, 2016.

(51) Int. Cl.
*H04W 72/08* (2009.01)
*H04W 72/12* (2009.01)
*H04L 1/18* (2006.01)
*H04W 16/14* (2009.01)

(52) U.S. Cl.
CPC .......... *H04L 1/1861* (2013.01); *H04L 5/0044* (2013.01); *H04L 5/0053* (2013.01); *H04L 5/0057* (2013.01); *H04W 72/042* (2013.01); *H04W 72/0446* (2013.01); *H04W 72/082* (2013.01); *H04W 72/1284* (2013.01); *H04L 1/1887* (2013.01); *H04W 16/14* (2013.01); *H04W 72/1215* (2013.01)

(58) Field of Classification Search
CPC .......... H04W 72/1284; H04W 72/1215; H04L 1/1861; H04L 5/0053; H04L 1/1854; H04L 5/0044; H04L 1/1822; H04L 23/00; H04L 1/1887; H04L 5/0057
USPC .................................................. 370/329, 336
See application file for complete search history.

(56) References Cited

U.S. PATENT DOCUMENTS

| | | | |
|---|---|---|---|
| 2016/0044619 A1* | 2/2016 | Ryu | H04W 76/14 370/350 |
| 2016/0226649 A1* | 8/2016 | Papasakellariou | H04L 5/0057 |
| 2017/0295570 A1* | 10/2017 | Awad | H04W 72/0446 |
| 2018/0006791 A1* | 1/2018 | Marinier | H04L 1/0026 |
| 2018/0077698 A1* | 3/2018 | Takeda | H04L 1/1861 |
| 2018/0167173 A1* | 6/2018 | Guan | H04L 1/1829 |
| 2018/0167935 A1* | 6/2018 | Yan | H04W 72/04 |
| 2018/0213525 A1* | 7/2018 | Nan | H04W 72/04 |
| 2018/0375619 A1* | 12/2018 | Hwang | H04B 7/26 |

FOREIGN PATENT DOCUMENTS

| | | |
|---|---|---|
| WO | 2015050743 A1 | 4/2015 |
| WO | 2016057191 A1 | 4/2016 |

* cited by examiner

UPLINK PROCEDURES ON A SHARED COMMUNICATION MEDIUM

CROSS-REFERENCE TO RELATED APPLICATIONS

The present Application for Patent claims the benefit of U.S. Provisional Application No. 62/348,715, entitled "ACKNOWLEDGMENT PROCEDURES ON A SHARED COMMUNICATION MEDIUM," filed Jun. 10, 2016, U.S. Provisional Application No. 62/349,599, entitled "ACKNOWLEDGMENT PROCEDURES ON A SHARED COMMUNICATION MEDIUM," filed Jun. 13, 2016, and U.S. Provisional Application No. 62/350,698, entitled "ACKNOWLEDGMENT PROCEDURES ON A SHARED COMMUNICATION MEDIUM," filed Jun. 15, 2016, each assigned to the assignee hereof, and each expressly incorporated herein by reference in its entirety.

INTRODUCTION

Aspects of this disclosure relate generally to telecommunications, and more particularly to uplink procedures on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell access point cellular network operations, such as LTE operations, have been extended into the unlicensed frequency spectrum such as the Unlicensed National Information Infrastructure (U-NII) band used by Wireless Local Area Network (WLAN) technologies. This extension of small cell access point LTE operation is designed to increase spectral efficiency and hence the capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

The present disclosure relates generally to uplink procedures on a shared communication medium. In an aspect, a method of communicating on a shared communication medium includes receiving, at an access terminal, a downlink subframe from an access point on the shared communication medium, and in response to receiving the downlink subframe, transmitting, by the access terminal, uplink control information (UCI) for the downlink subframe on a first uplink subframe of a first UCI channel of a plurality of UCI channels.

In an aspect, an apparatus for communicating on a shared communication medium includes a transceiver of an access terminal configured to receive a downlink subframe from an access point on the shared communication medium, and at least one processor of the access terminal configured to cause the transceiver to transmit, in response to reception of the downlink subframe, uplink control information (UCI) for the downlink subframe on a first uplink subframe of a first UCI channel of a plurality of UCI channels.

In an aspect, an apparatus for communicating on a shared communication medium includes a communication means of an access terminal configured to receive a downlink subframe from an access point on the shared communication medium, and a processing means of the access terminal configured to cause the communication means to transmit, in response to reception of the downlink subframe, uplink control information (UCI) for the downlink subframe on a first uplink subframe of a first UCI channel of a plurality of UCI channels.

In an aspect, a non-transitory computer-readable medium storing computer-executable instructions for communicating on a shared communication medium includes computer-executable instructions comprising at least one instruction to cause an access terminal to receive a downlink subframe from an access point on the shared communication medium, and at least one instruction to cause the access terminal to transmit, in response to reception of the downlink subframe, uplink control information (UCI) for the downlink subframe on a first uplink subframe of a first UCI channel of a plurality of UCI channels.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
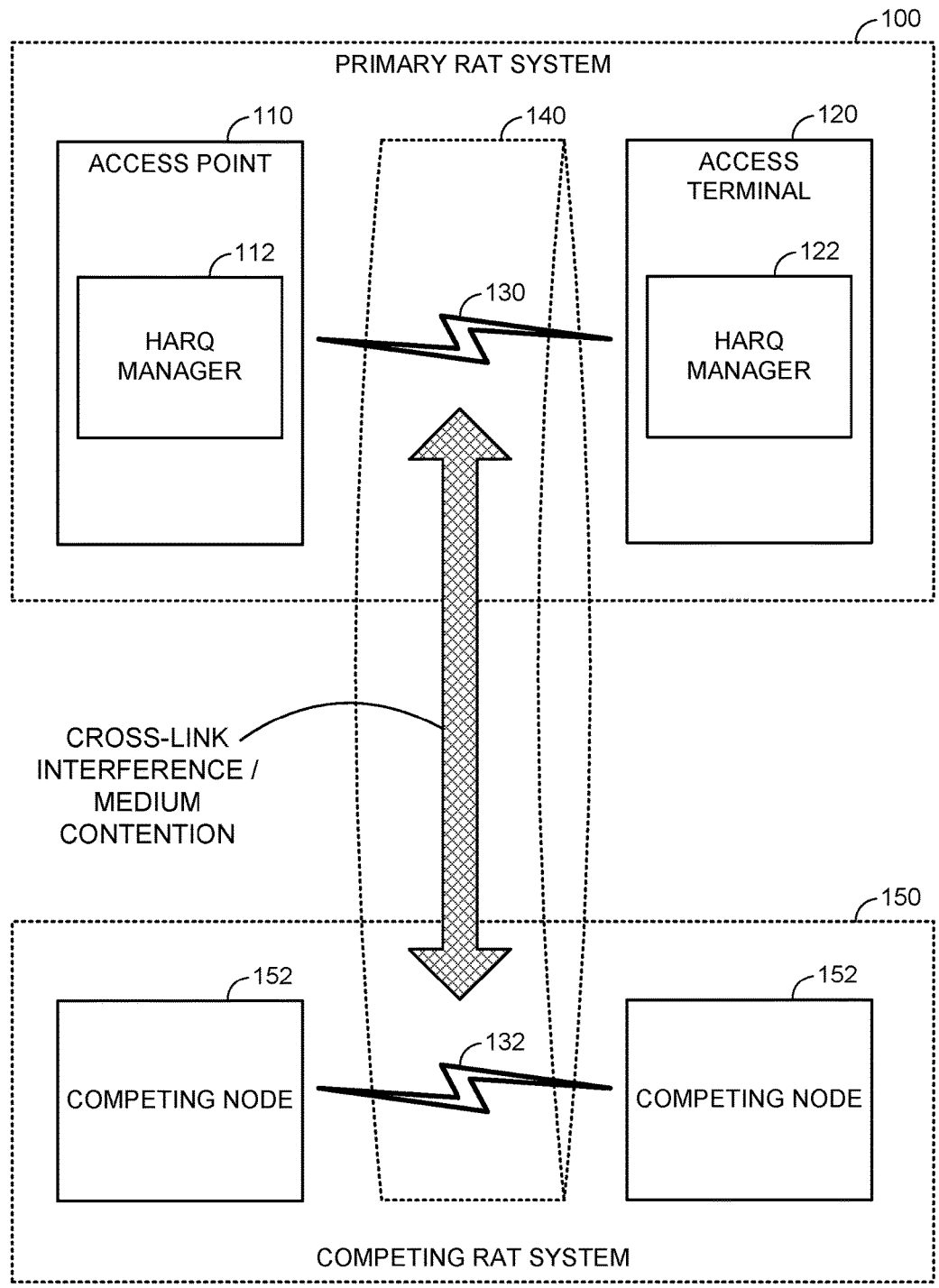
FIG. 1 is a system-level diagram illustrating an example wireless network environment according to at least one aspect of the disclosure.

The present disclosure relates generally to uplink procedures on a shared communication medium. An access terminal may need to perform various uplink operations to support communication with an access point on a shared communication medium. For example, an access terminal may transmit various Uplink Control Information (UCI) to the access point, such as Acknowledgment or Non-Acknowledgment messages (ACKs/NACKs), Channel Quality Indicators (CQIs), Scheduling Requests (SRs), Buffer Status Reports (BSRs), and so on. An access terminal transmits these "UCI transmissions" in a UCI payload during a given uplink subframe, such as via a Physical Uplink Control Channel (PUCCH) or a Physical Uplink Shared Channel (PUSCH). The PUCCH and the PUSCH may be further categorized into a short PUCCH (sPUCCH), an enhanced PUCCH (ePUCCH), and/or an enhanced PUSCH (ePUSCH). Each of these "UCI channels" may support different sized UCI payloads, have different Listen-Before-Talk (LBT) requirements, and/or have different timelines (i.e., the relationship between the time at which the access terminal receives the grant of access to the UCI channel from the access point on the downlink and the time at which the access terminal sends the ACK to the access point on the uplink). Additionally, information specific to a given access terminal can be provided in the grant-based uplink transmissions, whereas only broadcast information can be signaled via group triggers.

Uplink transmission of the UCI payload faces multiple challenges in a wireless network environment in which a "primary" RAT system and one or more "competing" RAT systems share a communication medium. For example, due to the shared nature of the communication medium, interference at the access terminal from a competing RAT system may cause LBT failures. Interference at the access point from a competing RAT system may cause decoding failures. To address these issues, the access terminal may ACK/NACK the same downlink subframe multiple times. This redundancy may be further increased by transmitting the ACK/NACK across multiple UCI channels depending on the grants or resources that are available on those channels. However, this redundancy may cause managing error events (e.g., repetitions) to be more challenging. Accordingly, various techniques are provided herein to coordinate the UCI payload as well as the transmission resources associated therewith.

For example, in an aspect, an access terminal receives a downlink subframe from an access point on the shared communication medium and, in response to receiving the downlink subframe, transmits UCI for the downlink subframe on a first uplink subframe of a first UCI channel of a plurality of UCI channels. In an aspect, the first UCI channel may be the first available UCI channel of the plurality of UCI channels for transmitting the UCI, and the access terminal may not repeat transmission of the UCI on another channel of the plurality of UCI channels. In another aspect, the access terminal may be configured to transmit all UCI for all received downlink frames on the first UCI channel, regardless of availability of other UCI channels of the plurality of UCI channels. In yet another aspect, the access terminal may, in response to receiving the downlink subframe, transmit the UCI on a second uplink subframe of a second UCI channel of the plurality of UCI channels, where the UCI is transmitted on the second uplink subframe of the second UCI channel only before expiration of a configured time duration. In yet another aspect, the access terminal may select the first UCI channel without input from the access point based on characteristics of the plurality of UCI channels.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, tablet computer, laptop computer, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or more RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi, and the Citizens Broadband Radio Service (CBRS) band.

In some instances, a shared spectrum band may refer to spectrum that is lightly licensed and/or in which there may be some level of coordination among communications of different RATs or some level of preference given to communications of a particular RAT, such as an incumbent RAT, for example. In other instances, a shared spectrum band may generally refer to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes.

Due to the shared use of the communication medium 140, there is the potential for cross-link interference between the wireless link 130 and the wireless link 132. Further, some RATs and some jurisdictions may require contention or LBT for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the uplink procedures on a shared communication medium discussed briefly above. For example, the access point 110 may include a Hybrid Automated Repeat Request (HARQ) manager 112 and the access terminal 120 may include a HARQ manager 122. In an aspect, the HARQ manager 112 and/or the HARQ manager 122 may be configured in different ways to manage transmission and reception of acknowledgment information, as described further herein.

Figure 2:
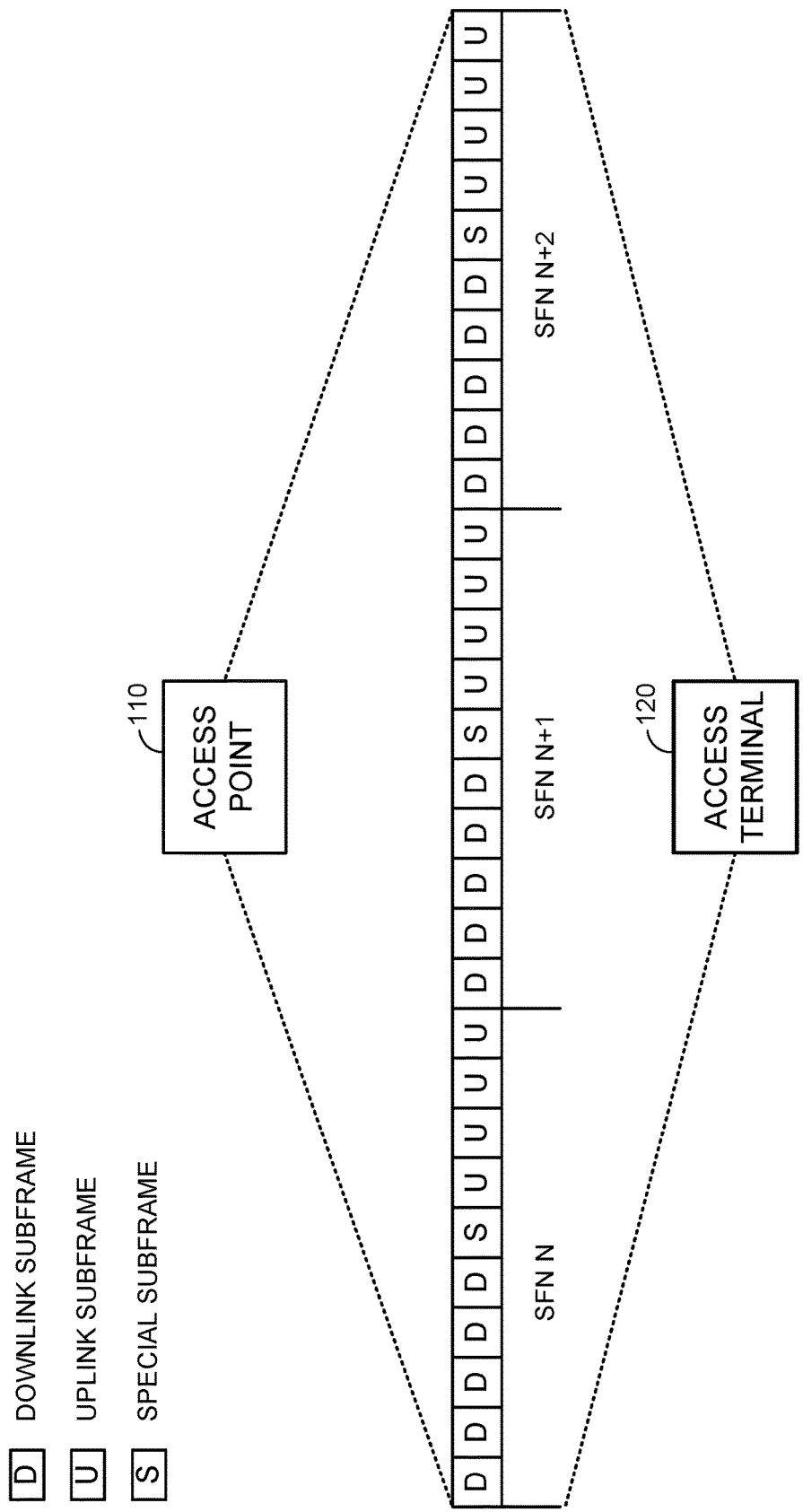
FIG. 2 illustrates an example frame structure according to at least one aspect of the disclosure.

FIG. 2 illustrates an example frame structure that may be implemented for the primary RAT system 100 to facilitate contention-based access to the communication medium 140.

The illustrated frame structure includes a series of radio frames (RFs) that may be numbered in accordance with a System Frame Number (SFN) numerology (SFN N, N+1, N+2, etc.) and divided into respective subframes (SFs), which may also be numbered for reference (e.g., SF0, SF1, etc.). Each respective subframe may be further divided into slots, and the slots may be further divided into symbol periods (SP) (not shown in FIG. 2). As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). Each subframe may comprise two slots, and each slot may comprise six or seven symbol periods. The use of a frame structure may provide more natural and efficient coordination among devices than other ad hoc signaling techniques.

The example frame structure of FIG. 2 is a Time Division Duplexing (TDD) frame structure in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Some TDD configurations may have more downlink subframes and some may have more uplink subframes to accommodate different traffic scenarios.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe, that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., SFN N) may be delayed in relation to an absolute time until the access point 110 or the access terminal 120 is able to win contention.

As will be described in more detail below, the access terminal 120 may need to perform various uplink operations to support communication with the access point 110 on the communication medium 140. For example, the access terminal 120 may, autonomously or upon request, transmit various UCI to the access point 110, such as ACKs/NACKs, CQIs, a SRs, BSRs, and so on. Various techniques are therefore provided herein to coordinate the UCI payload as well the transmission resources associated therewith.

Figure 3:
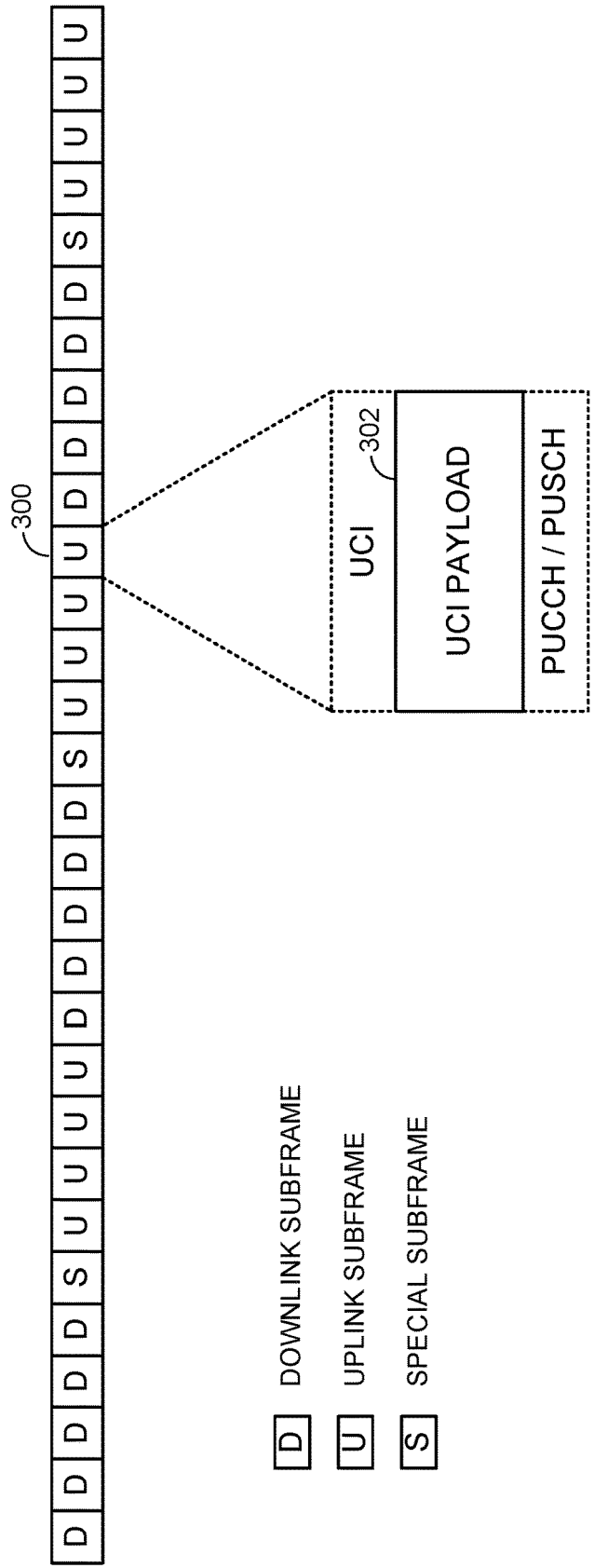
FIG. 3 is a timing diagram illustrating an example of Uplink Control Information (UCI) payload coordination according to at least one aspect of the disclosure.

FIG. 3 is a timing diagram illustrating an example of UCI payload coordination according to at least one aspect of the disclosure. In this example, the access terminal 120 transmits a UCI payload 302 composed of one or more bits during a given uplink subframe 300, such as via a PUCCH or a PUSCH. As noted above, the PUCCH and the PUSCH may be further categorized into an sPUCCH, an ePUCCH, and/or an ePUSCH. In some instances, an sPUCCH may be an uplink control channel that occupies fewer than 14 symbols. The sPUCCH may, for example, be included in an uplink portion of a special subframe. As discussed above, the UCI payload 302 may be variously configured to convey an ACK/NACK, CQI, a SR, a BSR, and so on. Transmission of an ACK/NACK, CQI, SR, BSR, etc., in the UCI payload 302 may be referred to herein as a "UCI transmission."

As noted above, the access point 110 and/or the access terminal 120 may include a HARQ manager 112 and a HARQ manager 122, respectively. The HARQ manager 122 may be configured to transmit, or cause the transmission of, the UCI payload 302, including any ACK/NACK, CQI, SR, BSR, etc., to the HARQ manager 112. This HARQ feedback may be transmitted on one or more different channels, such as the sPUCCH, ePUCCH, and/or ePUSCH.

Feedback (e.g., ACK/NACK, CQI, SR, BSR, etc., in the UCI payload 302) on the sPUCCH may be trigger-based. Specifically, it may be triggered by the common Physical Downlink Control Channel (PDCCH) for a group of users, possibly even all the users served by the access point 110. Feedback on the ePUCCH may be either trigger-based, as with the sPUCCH, or uplink grant-based. Feedback on the ePUSCH may be uplink grant-based.

As noted above, each of the sPUCCH, ePUCCH, and ePUSCH (referred to herein as "UCI channels") may support different sized payloads (e.g., UCI payload 302). For example, the sPUCCH may support payloads of approximately 10 to 30 bits, while the ePUCCH may support payloads of approximately 75 to 100 bits. In addition, each UCI channel may have different LBT requirements. For example, within 16 μs of a downlink transmission, the sPUCCH may carry an ACK/NACK without LBT. Further, each UCI channel may have different timelines (i.e., the relationship between the time at which the access terminal 120 receives the grant of access to the UCI channel from the access point 110 on the downlink and the time at which the access terminal 120 sends the ACK to the access point 110 on the uplink). Additionally, information specific to a given access terminal, e.g., access terminal 120, can be provided in the grant-based uplink transmissions, whereas only broadcast information can be signaled via group triggers.

Uplink transmission of the UCI payload 302 faces multiple challenges in the exemplary wireless network environment illustrated in FIG. 1 having the "primary" RAT system 100 and the "competing" RAT system 150. For example, due to the shared nature of the communication medium 140 of FIG. 1, interference from the competing RAT system 150 (and/or another competing RAT system) at the access terminal 120 may cause LBT failures. Interference from the competing RAT system 150 (and/or another competing RAT system) at the access point 110 may cause decoding failures.

To address this issue, the access terminal 120 may ACK/NACK the same downlink subframe multiple times. This redundancy in acknowledging the same downlink subframe may be further increased by transmitting the ACK/NACK (in a UCI payload 302) across multiple UCI channels depending on the grants or resources that are available on those channels.

Figure 4:
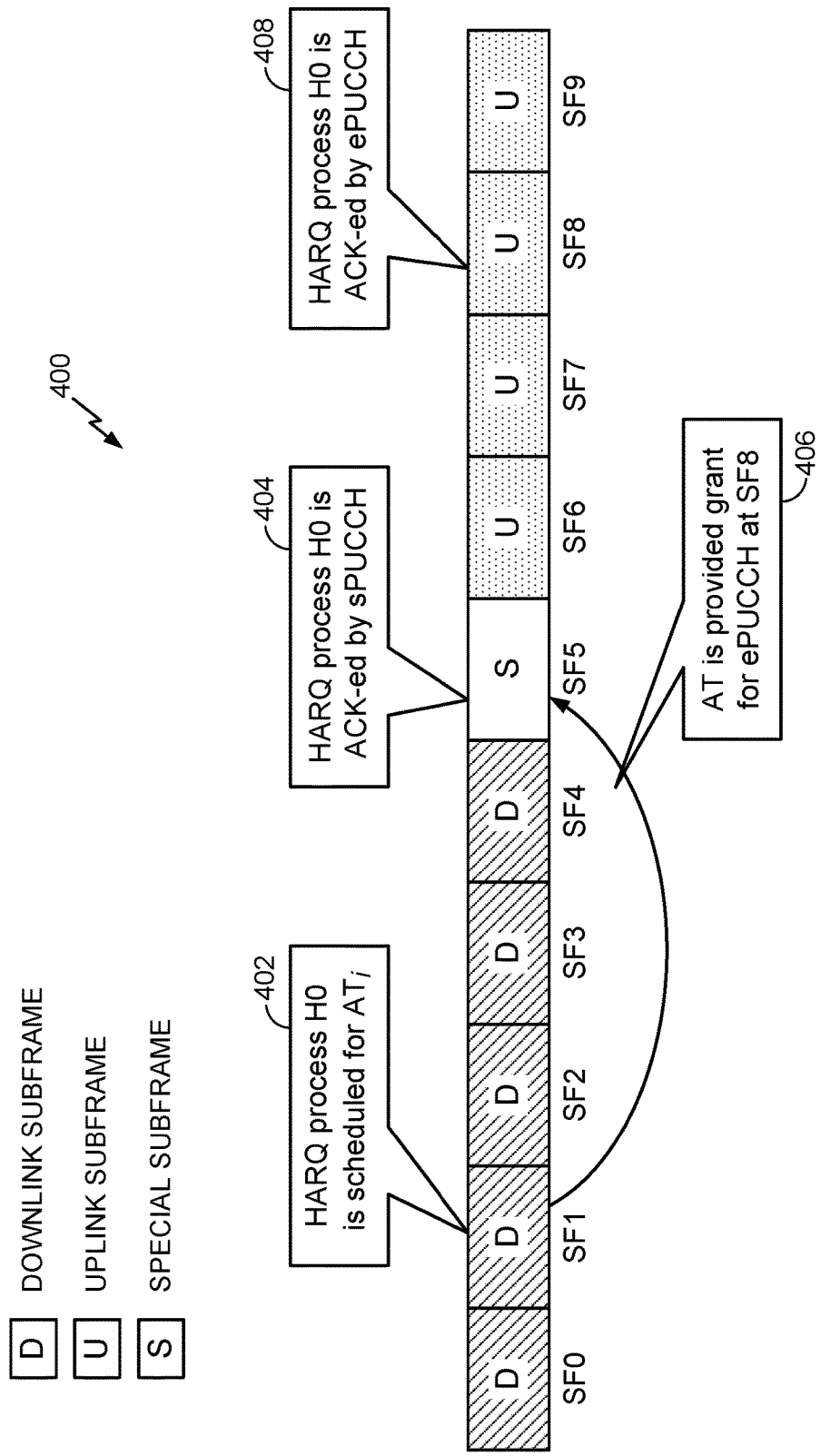
FIG. 4 illustrates an exemplary hybrid automated repeat request (HARQ) timing diagram in which an access terminal transmits an acknowledgment in the UCI payload on multiple UCI channels, according to at least one aspect of the disclosure.

FIG. 4 illustrates an exemplary HARQ timing diagram 400 in which an access terminal (e.g., access terminal 120) transmits an ACK/NACK (i.e., UCI) in the UCI payload 302 on multiple UCI channels according to at least one aspect of the disclosure. The HARQ timing diagram 400 illustrates an exemplary pattern of five downlink (D) subframes (SF0 to SF4), a special (S) subframe (SF5), and four uplink (U) subframes (SF6 to SF9). As will be appreciated, however, there may be more or fewer than five downlink subframes and more or fewer than four uplink subframes, depending on the implementation.

In the HARQ timing diagram 400, the access terminal 120 attempts to transmit an ACK/NACK of a scheduled downlink subframe in a UCI payload (e.g., UCI payload 302) on the sPUCCH at the earliest uplink subframe that is at least X subframes after the scheduled downlink subframe, as counted within the transmission opportunities (TxOPs) of the access point 110. Note that if the legacy LTE time difference is maintained, X would be four subframes. Thus, in the example of FIG. 4, a HARQ process H0 is scheduled, or received, at downlink subframe SF1 (operation 402). Four subframes later, at special subframe SF5, the access terminal 120 acknowledges HARQ process H0 on the sPUCCH (operation 404).

Additionally, to provide a level of redundancy, at downlink subframe SF4, the access terminal 120 receives an access grant for the ePUCCH for uplink subframe SF8 (operation 406). As such, at uplink subframe SF8, the access terminal 120 transmits, in a UCI payload (e.g., UCI payload 302) on the ePUCCH, an ACK/NACK of the HARQ process H0 received at downlink subframe SF1 (operation 408).

Figure 5:
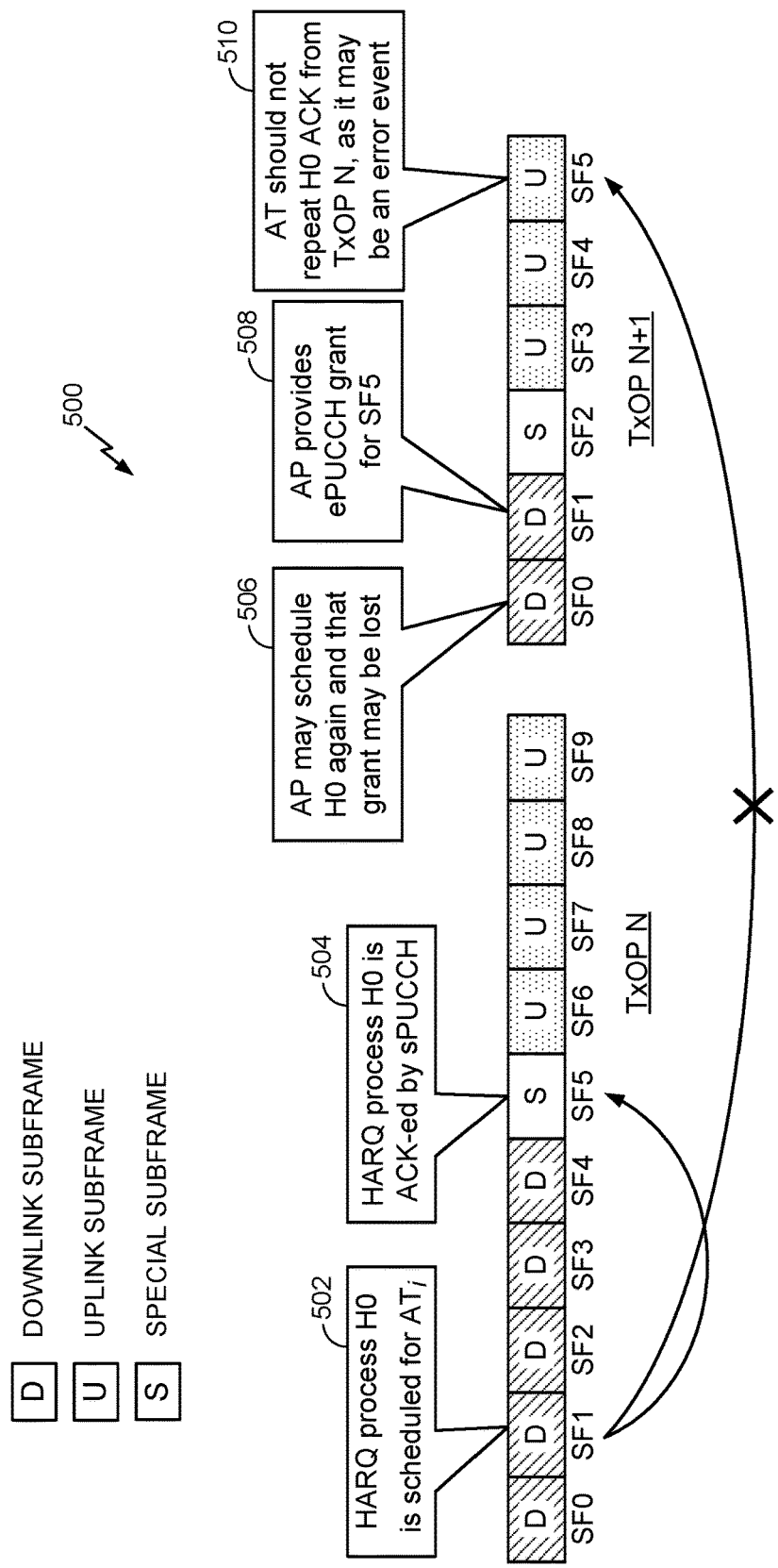
FIG. 5 illustrates an exemplary HARQ timing diagram in which an error event due to acknowledgment repetition across UCI channels occurs, according to at least one aspect of the disclosure.

This redundancy may cause managing error events (e.g., repetitions) to be more challenging. FIG. 5 illustrates an exemplary HARQ timing diagram 500 in which an error event due to ACK/NACK repetition across UCI channels occurs, according to at least one aspect of the disclosure. The HARQ timing diagram 500 illustrates a first access point transmission opportunity (TxOP N) having an exemplary pattern of five downlink (D) subframes (SF0 to SF4), a special (S) subframe (SF5), and four uplink (U) subframes (SF6 to SF9), and a second access point transmission opportunity (TxOP N+1) having an exemplary pattern of two downlink (D) subframes (SF0 to SF1), a special (S) subframe (SF2), and three uplink (U) subframes (SF3 to SF5). As will be appreciated, however, there may be more or fewer than five and two downlink subframes and more or fewer than four and three uplink subframes, respectively, depending on the implementation.

In the HARQ timing diagram 500, similar to the HARQ timing diagram 400, the access terminal (e.g., access terminal 120) attempts to transmit an ACK/NACK of a scheduled downlink subframe in a UCI payload (e.g., UCI payload 302) on the sPUCCH at the earliest uplink subframe that is at least X (e.g., 4 in LTE) subframes after the scheduled downlink subframe. Thus, in the example of FIG. 5, a HARQ process H0 is scheduled, or received, at downlink subframe SF1 of TxOP N (operation 502). Four subframes later, at special subframe SF5, the access terminal 120 acknowledges HARQ process H0 on the sPUCCH (operation 504).

At downlink subframe SF0 of TxOP N+1, the access point (e.g., access point 110) again schedules, or grants, access to the HARQ process H0 (operation 506). However, in the example of FIG. 5, this grant is lost (e.g., due to interference from other devices in a shared communication medium). At downlink subframe SF1 of TxOP N+1, the access terminal 120 receives an access grant for the ePUCCH for uplink subframe SF5 of TxOP N+1 (operation 508). As in FIG. 4, the access terminal 120 may use this grant to (redundantly) acknowledge a previously received, or scheduled, HARQ process H0.

Because the last HARQ process H0 that was scheduled was at downlink subframe SF0 of TxOP N+1, the access point 110 will expect that any ACK/NACK received at uplink subframe SF5 of TxOP N+1 is for the grant at downlink subframe SF0 of TxOP N+1. However, because the grant at downlink subframe SF0 of TxOP N+1 was lost, the grant for HARQ process H0 at downlink subframe SF1 of TxOP N is the last grant that the access terminal 120 received for the HARQ process H0. Thus, at uplink subframe SF5 of TxOP N+1, the access terminal 120 will ACK/NACK the HARQ process H0 received at downlink subframe SF1 of TxOP N (operation 510), instead of the HARQ process H0 received at downlink subframe SF0 of TxOP N+1, which is an error.

There are several ways to address these types of errors. A first solution is to transmit UCI transmissions (e.g., ACK/NACK, CQI, SR, BSR, etc., in the UCI payload 302) on the first occurring UCI channel (i.e., sPUCCH, ePUCCH, or ePUSCH). In this solution, the access terminal 120 transmits the UCI at the first opportunity of the sPUCCH, the ePUCCH, or the ePUSCH. Once transmitted, the access terminal 120 does not repeat transmission of the UCI on the other UCI channels. The particular HARQ process (e.g., HARQ process H0) is set to NACK in the HARQ buffer after any UCI transmission. An advantage of this solution is that it precludes error events arising from transmitting the same UCI on multiple UCI channels.

Another solution is to transmit UCI transmissions on a pre-configured UCI channel. In this solution, each access terminal 120 may be pre-configured to transmit the UCI on a fixed UCI channel, whether it is the sPUCCH, the ePUCCH, or the ePUSCH. For example, the access terminal 120 may be configured to choose the first available of the sPUCCH, the ePUCCH, or the ePUSCH, and then continue to transmit UCI transmissions on that channel. An advantage of this solution is that it allows the limited channel resources of the sPUCCH, ePUCCH, and ePUSCH to be partitioned among access terminals 120.

For access terminals 120 that have not received this semi-static configuration, there may be some additional resources set aside for UCI transmissions, or the ePUSCH mechanism (because it is grant-based) may be used. The particular HARQ process (e.g., HARQ process H0) is set to NACK in the HARQ buffer after any UCI transmission.

A third solution is to allow UCI redundancy under a time constraint. In this solution, the access terminal 120 is allowed to repeat UCI transmissions for a given HARQ process on multiple UCI channels within a certain fixed time duration. Such a fixed time constraint facilitates the avoidance of the error events described above with reference to FIG. 5. For example, under a time constraint, the access terminal 120 would not acknowledge the grant for HARQ process H0 received at downlink subframe SF1 of TxOP N on the ePUCCH at uplink subframe SF5 of TxOP N+1 because the time constraint would have expired. An advantage of the time constraint solution is the introduction of increased LBT diversity by allowing repetitions and the avoidance of error events.

As an example of a time constraint, within the same TxOP, the access terminal 120 may repeat a UCI transmission for a given HARQ process on the sPUCCH, ePUSCH, and/or ePUCCH, as available. Once the current TxOP ends, further repetition of the UCI transmission for the given HARQ process is not allowed. As such, the HARQ processes already acknowledged through any of the UCI channels are set to NACK in the HARQ buffer. The access point 110 may configure the access terminal 120 to use this time constraint.

As another example of a time constraint, within a certain time "T" ms, the access terminal 120 may repeat UCI transmissions on the sPUCCH, ePUSCH, and/or ePUCCH, as available. Once the pre-configured time duration ends, further repetition of the UCI transmission for the given HARQ process is not allowed. As such, the HARQ processes already acknowledged through any of the UCI channels are set to NACK in the HARQ buffer. The time T ms may be configured by the access point 110.

Yet another solution is to allow the access terminal 120 to autonomously select the UCI channel, which should be coupled with blind detection by the access point 110. More specifically, the access terminal 120 may transmit HARQ feedback, i.e., UCI transmissions, on any of the UCI channels, depending on the channel, interference, and link budget conditions. For example, if the UCI payload (e.g., UCI payload 302) is small, the access terminal 120 may choose to use the sPUCCH (which may support payloads of approximately 10 to 30 bits), and may choose to use the ePUCCH (which may support payloads of approximately 75 to 100 bits) otherwise. As another example, if the access terminal 120 is at a cell edge (as determined based on radio frequency (RF) measurements), the access terminal 120 may choose to use the ePUCCH, and to use the sPUCCH otherwise. An advantage of this solution is that it minimizes overhead and allows the access terminal 120 to choose the appropriate vehicle for UCI transmissions.

Note that autonomous UCI channel selection by the access terminal 120 may be combined with the other solutions discussed above to avoid, or at least minimize, error events. For example, in the second solution, where each access terminal 120 may be pre-configured to transmit the UCI on a fixed UCI channel, the access terminal 120 may autonomously select the UCI channel. Similarly, in the third solution, where the access terminal 120 is allowed to repeat UCI transmissions for a given HARQ process on multiple UCI channels within a certain fixed time duration, the access terminal 120 may autonomously select the UCI channels on which to transmit the UCI within the time constraint.

A related solution is that simultaneous transmission by the access terminal 120 on the ePUCCH and the ePUSCH during the same subframe is not allowed. Instead, if a grant is available on the ePUSCH, the ePUCCH is automatically skipped and the contents are multiplexed onto the ePUSCH.

In an aspect, the configurations of the access terminal 120 discussed above may be controlled by and/or reside in the HARQ manager 122. In an aspect, these configurations may be received in the HARQ manager 122 from the access point 110 based on information controlled by and/or resident in the HARQ manager 112.

There are timing considerations related to transmission on the ePUCCH. Specifically, the ePUCCH and the sPUCCH may have different HARQ timelines. For example, a UCI transmission on the sPUCCH may occur on the special (S) subframe, as illustrated in FIG. 4. In contrast, a UCI transmission on the ePUCCH is triggered to occur on an uplink (U) subframe, as also illustrated in FIG. 4.

Figure 6:
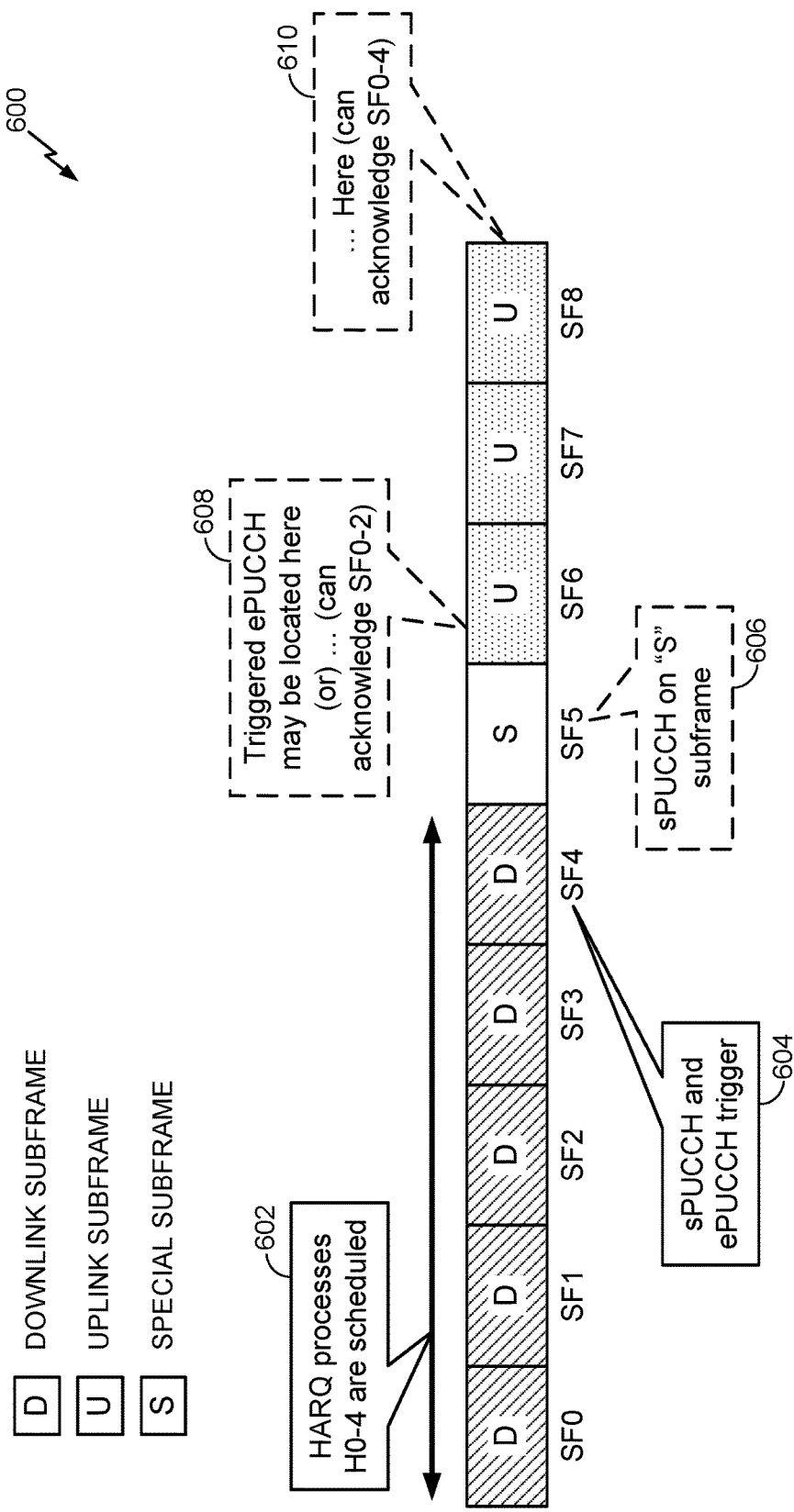
FIG. 6 is an exemplary HARQ timing diagram illustrating timing considerations related to transmission on certain channels, according to at least one aspect of the disclosure.

FIG. 6 is an exemplary HARQ timing diagram 600 illustrating timing considerations related to transmission on the ePUCCH and the sPUCCH according to at least one aspect of the disclosure. The HARQ timing diagram 600 illustrates an exemplary pattern of five downlink (D) subframes (SF0 to SF4), a special (S) subframe (SF5), and three uplink (U) subframes (SF6 to SF8). As will be appreciated, however, there may be more or fewer than five downlink subframes and more or fewer than three uplink subframes, depending on the implementation.

As shown in FIG. 6, HARQ processes H0 to H4 are scheduled at downlink subframes SF0 to SF4 (operation 602). At downlink subframe SF4, the access terminal 120 receives a grant, or trigger, to transmit UCI transmissions on the sPUCCH and the ePUCCH (operation 604). Similar to the timeline illustrated in FIG. 4, the access terminal 120 may acknowledge the first two downlink subframes SF0 and SF1 on the sPUCCH at the special subframe SF5 (operation 606).

However, the trigger received at downlink subframe SF4 may schedule the UCI transmission for the ePUCCH for the first subframe of the uplink burst (i.e., uplink subframe SF5), which eliminates the need for a special LBT gap on a later subframe. In this case, the UCI transmission at uplink subframe SF5 may acknowledge downlink subframes SF0 to SF2 (operation 608) (where the access terminal 120 acknowledges a downlink subframe at least four subframes after the downlink subframe, as in legacy LTE). Alternatively, the trigger received at downlink subframe SF4 may schedule the UCI transmission for the ePUCCH for the last subframe of the uplink burst (i.e., uplink subframe SF8), which allows for more subframes in the same TxOP to be acknowledged by incorporating additional subframes within the TxOP N to N+4 timeline. In this case, the UCI transmission at uplink subframe SF8 may acknowledge downlink subframes SF0 to SF4 (operation 610) (where, again, the access terminal 120 acknowledges a downlink subframe at least four subframes after the downlink subframe, as in legacy LTE).

Another consideration of the present disclosure is resource allocation on the UCI channels. A "resource" for UCI transmissions is defined as the combination of an interlace index and a multiplexing index. For example, if 10 interlaces of the sPUCCH are available and each interlace can allow multiplexing of up to two access terminals 120, this creates 20 sPUCCH resources. The multiplexing index may refer to the cyclic shift index or the Walsh code/ Orthogonal Cover Code (OCC) index.

Figure 7:
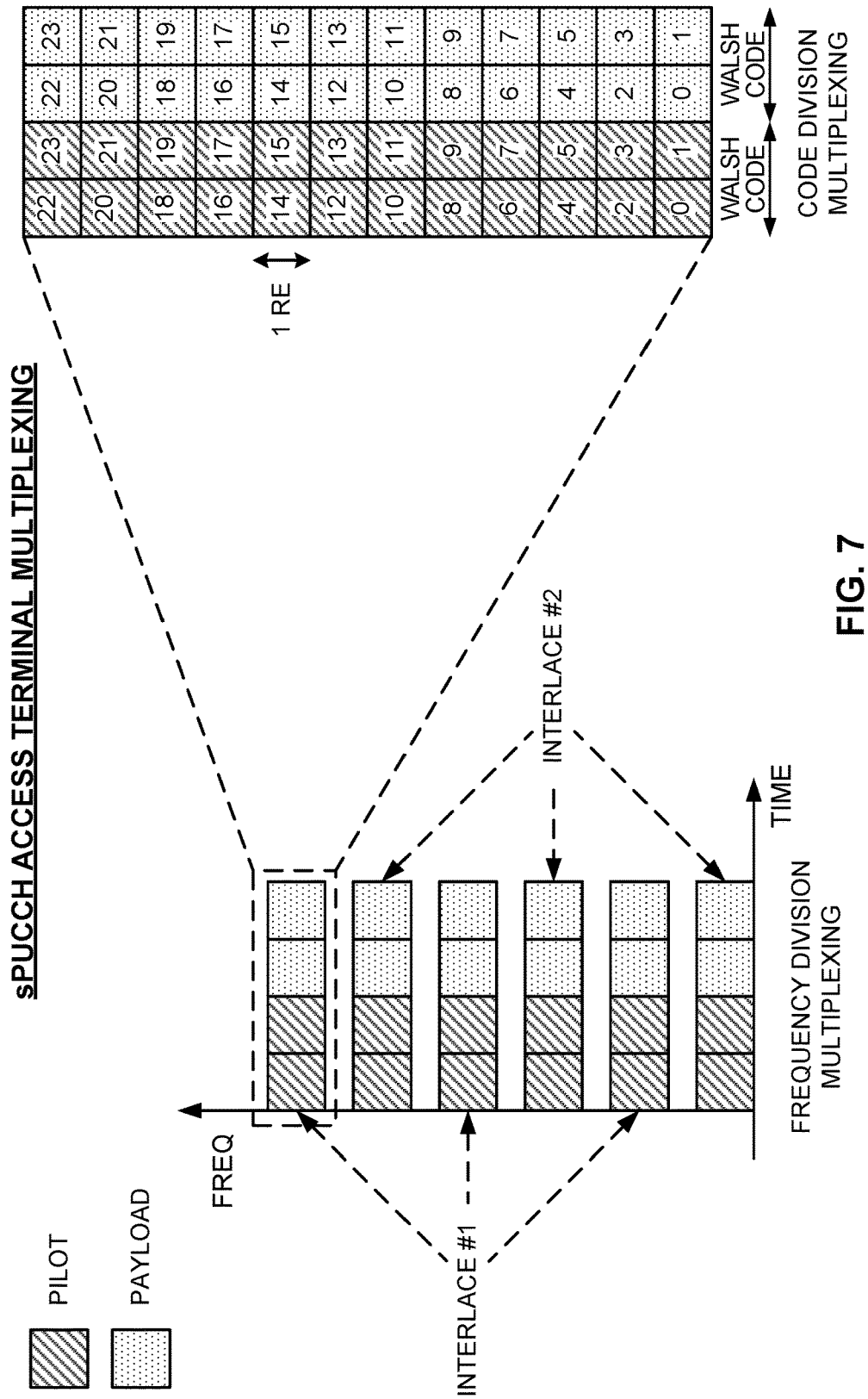
FIG. 7 is a resource map illustrating an example multiplexing scheme across access terminals according to at least one aspect of the disclosure.

FIG. 7 is a resource map illustrating an example sPUCCH multiplexing scheme across access terminals according to at least one aspect of the disclosure. In general, the sPUCCH may be frequency division multiplexed by allocating different interlaces to different access terminals. In the illustrated example, a first interlace (interlace #1) may be allocated to a first access terminal (e.g., the access terminal 120) and a second interlace (interlace #2) may be allocated to a second access terminal. Further, within a given interlace, multiple access terminals may be accommodated via code division multiplexing. The code division multiplexing may be achieved in the time domain, in the frequency domain, or both (as shown). In the time domain, Walsh codes may be used across symbol periods. The length of the Walsh codes employed may depend on the length of the sPUCCH (e.g., a length of two (2) in the illustrated example where N=4 and P=2). In the frequency domain, Walsh codes may be used across Resource Elements (REs) within a given Resource Block (RB).

In the case where the sPUCCH/ePUCCH for a given access terminal occupies multiple interlaces, the sPUCCH/ ePUCCH payload may be formed in one of two ways: (a) the sPUCCH/ePUCCH payload may be generated in totality across all the allocated interlaces followed by encoding and resource mapping, or (b) the sPUCCH/ePUCCH payload may be prepared based on a mapping of HARQ processes to interlaces. For example, a subset of HARQ processes may be mapped to a certain interlace and another subset of HARQ processes may be mapped to a different interlace. The access terminal 120 may determine which HARQ processes should be acknowledged based on whether single or multiple interlaces are allocated for its sPUCCH/ ePUCCH transmissions. This allocation may either be indicated in the grant for grant-based ePUCCH transmissions or the mapping rule defined semi-statically for trigger based sPUCCH or ePUCCH transmissions.

As noted above, the ePUSCH is uplink grant-based, and thus, the resource allocation is specified in the grant. Similarly, when the ePUCCH is uplink grant-based, resource allocation is specified in the grant. However, for trigger-based ePUCCH and sPUCCH, resource allocation needs to be specified in alternative ways.

The exact location of ePUCCH transmissions within an upcoming TxOP may occur at one of multiple possibilities. The ePUCCH may occur either on the first subframe of the upcoming uplink burst within the TxOP, the last subframe of the upcoming uplink burst within the TxOP, or on an upcoming periodic uplink anchor subframe (anchor subframes are pre-defined to occur at certain locations in time). This may be indicated to a multiple of access terminals using the C-PDCCH or to a subset of access terminals using an uplink grant. In an aspect, this indication may be made using a two-bit pattern that indicates one of four states: (1) no ePUCCH, (2) ePUCCH on the first subframe of an uplink burst, (3) ePUCCH on the last subframe of an uplink burst, or (4) ePUCCH on the periodic uplink subframe.

The access point scheduling mechanism should consider upcoming periodic uplink anchor subframes and configure other uplink transmissions to be consistent with this configuration. For instance, the access point scheduling mechanism should schedule the length of uplink grants (measured in subframes) that occupy the subframes before and after the anchor subframe and the LBT configuration for adjacent subframes to be consistent with the location of the periodic uplink anchor subframe.

For sPUCCH and ePUCCH, which are trigger-based, the payload size may be a variable depending on whether the SR occurs along with HARQ feedback and/or channel state information (CSI) feedback. This can be determined autonomously by the access point 110 by way of performing blind detection of the payload that is transmitted by the access terminal 120.

In LTE, the PUCCH resource index table is used to identify the PUCCH resources derived as a function of the starting Control Channel Element (CCE) of the PDCCH, the PUCCH shift, and the RB allocation.

An issue with resource allocation on the PUCCH is that each UCI vehicle (e.g., UCI payload 302) can carry the acknowledgment (ACK or NACK) for multiple downlink subframes, so the mapping based on the corresponding downlink grant may be ambiguous. For example, there are several choices for the starting CCE of the downlink grant (as used in LTE), such as the downlink grant of a specific subframe (e.g., the first downlink subframe) or the downlink grant that triggered the sPUCCH. However, using a downlink grant of a specific subframe may not work, as the access terminal 120 may lose some of the grants but should still be able to identify the PUCCH resource without ambiguity. Using the downlink grant that triggered the sPUCCH is not viable since it is a group trigger.

A solution to this issue is to allocate the PUCCH resources to the access terminals 120 semi-statically.

Another solution is to allocate PUCCH resources dynamically in every downlink grant that schedules the Physical Downlink Shared Channel (PDSCH). This solution would be applicable to trigger-based ePUCCH or sPUCCH. In particular, the access point 110 may either:
 (i) indicate the sPUCCH and ePUCCH resources in the downlink grant;
 (ii) indicate the sPUCCH and ePUCCH resources semi-statically;
 (iii) indicate the sPUCCH resources in the downlink grant and the ePUCCH resources semi-statically; or
 (iv) indicate the ePUCCH resources in the downlink grant and the sPUCCH resources semi-statically.

Another solution is to semi-statically assign subsets of the HARQ processes to each UCI channel, i.e., the sPUCCH, ePUCCH, and PUSCH. This solution minimizes the payload size of the UCI carried by each physical channel, thereby increasing reliability. This solution may also avoid, or at least minimize, the acknowledgement of the same HARQ process on multiple channels if the subset of HARQ processes is so chosen amongst the UCI channels.

For example, the access point 110 may schedule a subset of higher priority HARQ processes that are mapped to UCI channels with relatively faster HARQ turnaround time and that are likely to be acknowledged earlier (but may also be repeated on other UCI channels) by, for example, triggered UCI channels, such as the sPUCCH. Other HARQ processes (lower priority HARQ processes) may use UCI channels with slower HARQ turnaround times.

As another example, the access point 110 may schedule HARQ processes assigned to trigger-based UCI channels (e.g., sPUCCH) that may also be repeated on other UCI channels. If the HARQ process(es) are not acknowledged within a certain time, then the access point 110 may schedule access terminals 120 on additional HARQ processes to be acknowledged by other UCI channels.

Alternatively, the access terminal 120 may choose the payload size of the sPUCCH/ePUCCH and the UCI on the PUSCH channels based on a semi-static configuration of the number of HARQ processes to be acknowledged.

In an aspect, the access point 110 may also be allowed to indicate an "empty resource" if the access point 110 desires to preclude a certain downlink transmission to be acknowledged using sPUCCH/ePUCCH. This allows the access point 110 to perform better resource management.

Note that the sPUCCH carries UCI transmissions (e.g., ACK/NACK) corresponding to downlink subframes in the same TxOP (T) that meet the N to N+4 timeline, and pending UCI transmissions are transmitted in the next TxOP (T+1). A solution is that the access terminal 120 may receive a new downlink grant and hence a new sPUCCH resource of TxOP (T+1). In this case, the access terminal 120 uses the new resource of TxOP (T+1) to transmit the pending UCI transmission(s) from the previous TxOP(s).

An issue that may arise, however, is that the sPUCCH from a pending TxOP may consume resources that are not available to other access terminals 120. A solution is for the access point 110 to issue empty downlink grants with a new sPUCCH resource with either an alternative sPUCCH resource or an empty resource to free-up the current resources being used by the access terminal 120.

Another solution is for the sPUCCH carrying pending UCI transmissions to be configured to have a "time-out" period. Such a time-out period may be measured in, for example, TxOPs or absolute time (e.g., milliseconds). The time-out period may be statically or semi-statically configured or dynamically indicated.

Sounding Reference Signal (SRS) transmissions may either be configured by uplink grants specific to the access terminal 120 or common PDCCH triggers to multiple access terminals. The SRS may occur along with the ePUSCH, or the SRS may be transmitted along with sPUCCH resources. The transmission locations for each variant of SRS transmission may be different and the LBT configuration for each may be different. For SRS that is triggered by an uplink grant, there may be one or more dedicated bits that indicate the triggering of SRS transmissions by the access terminal 120. These bits may be enhanced to indicate that the SRS is transmitted on sPUCCH resources as opposed to along with the PUSCH. This may be accomplished by the access point 110 providing an empty PUSCH grant along with the SRS triggering bits "overloaded" to be interpreted differently if it is accompanied by an empty PUSCH grant. For instance, if the SRS trigger is accompanied by an empty PUSCH grant, the access terminal 120 may determine this to be an SRS on sPUCCH resources, accordingly performing its transmission and LBT consistent with SRS on sPUCCH resources.

Uplink control information may be configured to be transmitted over the PUSCH. The uplink control information may include one or more of a HARQ ACK/NACK, a CSI, an SR, etc., for one or more component carriers. Collectively, the UCI payload (e.g., UCI payload 302) including all configured component carriers may be a significant overhead on the PUSCH and may limit the modulation and coding scheme (MCS) that is used for PUSCH transmissions. In a multi-subframe grant, UCI transmission over the PUSCH may occur over one or more subframes, and this should be indicated to the access terminal 120 without ambiguity. These issues may be solved using the following approaches.

In an aspect, the access point 110 can indicate to the access terminal 120, using one or more bits in the multi-subframe grant, the subframe or subframes on which the UCI is to be multiplexed with the PUSCH. In particular, the access point 110 can indicate to the access terminal 120 the subframe or subframes on which the HARQ ACK/NACK feedback is to be multiplexed by the access terminal 120 with the PUSCH, and/or the subframe or subframes on which CSI/SR feedback is to be multiplexed by the access terminal 120 with the PUSCH. The bits in the grant may indicate the exact subframe for PUSCH/UCI multiplexing via a bitmap or by using a subset of bits to indicate one of the first, last, or periodic anchor subframes along with the possibility of no multiplexing of the UCI over the PUSCH.

To limit the impact of the UCI payload on the PUSCH performance, the UCI may be distributed over multiple subframes in one of the following ways: First, the UCI may be distributed over multiple subframes by multiplexing the HARQ ACK/NACK with the PUSCH on one set of one or more subframes and the CSI on a second set of one or more subframes that may or may not overlap with the first set of subframes. The location of the subframes that carry the HARQ ACK/NACK may be specified explicitly in the uplink grant or it may be inferred by an implicit relationship to the subframes that carry the CSI or other UCI.

Second, the UCI may be distributed over multiple subframes by multiplexing the HARQ ACK/NACK and/or the CSI of one subset of component carriers on one set of subframes, and that of a different set of component carriers on a second set of subframes, and so on. The location of the subframes that carry the UCI for a subset of component carriers may either be pre-configured semi-statically or indicated dynamically via the uplink grant.

Third, the UCI may be distributed over multiple subframes by multiplexing the HARQ ACK/NACK of a subset of HARQ processes spanning one or more component carriers on one set of one or more subframes, and that of a different set of HARQ processes on another set of one or more subframes, and so on. The location of the subframes that carry the HARQ ACK/NACK for a subset of HARQ processes may either be pre-configured semi-statically or indicated dynamically via the uplink grant.

Additionally, if the payload size of the UCI to be carried on a subframe is larger than a certain threshold, it may be preferable to limit the MCS of the PUSCH on that particular subframe. However, in a multi-subframe grant, the MCS of the PUSCH may not be indicated for all the subframes, and instead, the indication may correspond to a common MCS across all the subframes in the grant. In such cases, the access point 110 may preconfigure an alternative MCS to be used by the access terminal 120 depending on the UCI payload (e.g., UCI payload 302). The alternate MCS may either be specified as an absolute MCS as a function of the UCI payload size, or as a differential in MCS with respect to the MCS indicated in the grant.

In an aspect, the configurations requisite for the resource allocation discussed above may be controlled by and/or reside in the HARQ manager 122 on the access terminal 120. In an aspect, these configurations may be received in the HARQ manager 122 from the access point 110 based on information controlled by and/or resident in the HARQ manager 112.

Figure 8:
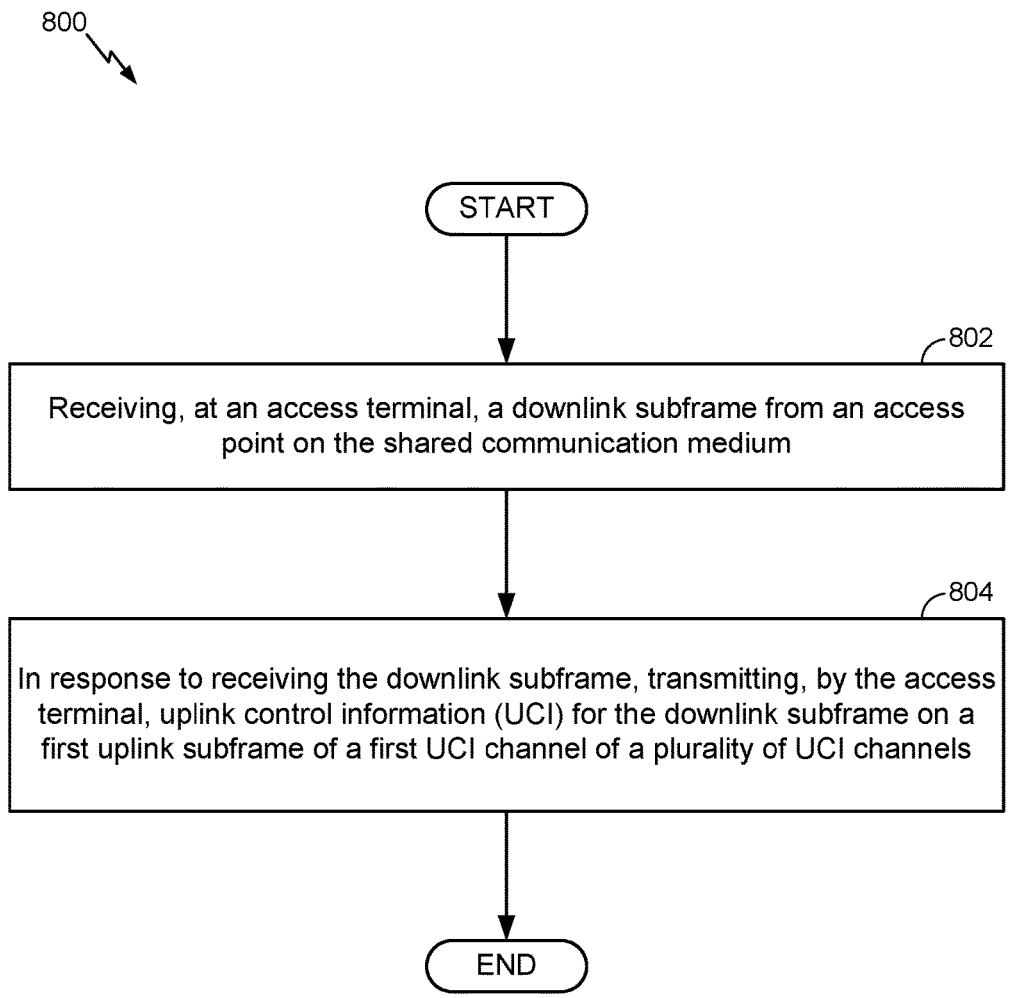
FIG. 8 is a flow diagram illustrating an example method of communication in accordance with the techniques described herein according to at least one aspect of the disclosure.

FIG. 8 is a flow diagram illustrating an example method 800 of communicating on a shared communication medium, such as shared communication medium 140, in accordance with the techniques described above. The method 800 may be performed, for example, by the access terminal 120. As an example, the communication medium may include one or more time, frequency, or space resources on an unlicensed radio frequency band shared between LTE technology and Wi-Fi technology devices.

At 802, the access terminal 120 receives a downlink subframe from the access point 110 on the shared communication medium 140.

At 804, in response to receiving the downlink subframe at 802, the access terminal 120 transmits UCI for the downlink subframe on a first uplink subframe of a first UCI channel of a plurality of UCI channels. In an aspect, the first UCI channel may be a first available UCI channel of the plurality of UCI channels, as described above. In that case, the access terminal 120 does not repeat transmission of the UCI on another channel of the plurality of UCI channels.

In an aspect, the access terminal 120 may be configured to transmit all UCI for all received downlink frames on the first UCI channel, regardless of availability of other UCI channels of the plurality of UCI channels.

In an aspect, the method 800 may further include the access terminal 120 transmitting, in response to receiving the downlink subframe, the UCI on a second uplink subframe of a second UCI channel of the plurality of UCI channels. In that case, the UCI may be transmitted on the second uplink subframe of the second UCI channel only before expiration of a configured time duration. In addition, the access terminal 120 does not repeat transmission of the UCI on another channel of the plurality of UCI channels after the expiration of the configured time duration. The configured time duration may be configured by the access point 110.

In an aspect, the access terminal 120 may select the first UCI channel without input from the access point 110 based on characteristics of the plurality of UCI channels. In that case, the characteristics of the plurality of UCI channels may include payload capabilities of the plurality of UCI channels, interference on the plurality of UCI channels, link budget conditions of the plurality of UCI channels, or any combination thereof.

In an aspect, the UCI may be contained in a UCI payload, and the UCI payload may contain UCI for multiple downlink subframes. In an aspect, uplink resources on the first UCI channel may be allocated semi-statically to the access terminal 120. Alternatively, uplink resources on the first UCI channel may be dynamically allocated in the downlink subframe. In that case, the dynamic allocation of the uplink resources indicates: a first grant-based uplink resource and a second grant-based uplink resource in the downlink subframe, the first grant-based uplink resource and the second grant-based resource semi-statically, the first grant-based uplink resource in the downlink subframe and the second grant-based resource semi-statically, or the second grant-based uplink resource in the downlink subframe and the first grant-based resource semi-statically.

For generality, the access point 110 and the access terminal 120 are shown in FIG. 1 only in relevant part as including the HARQ manager 112 and the HARQ manager 122, respectively. It will be appreciated, however, that the access point 110 and the access terminal 120 may be configured in various ways to provide or otherwise support the acknowledgment signaling techniques discussed herein.

Figure 9:
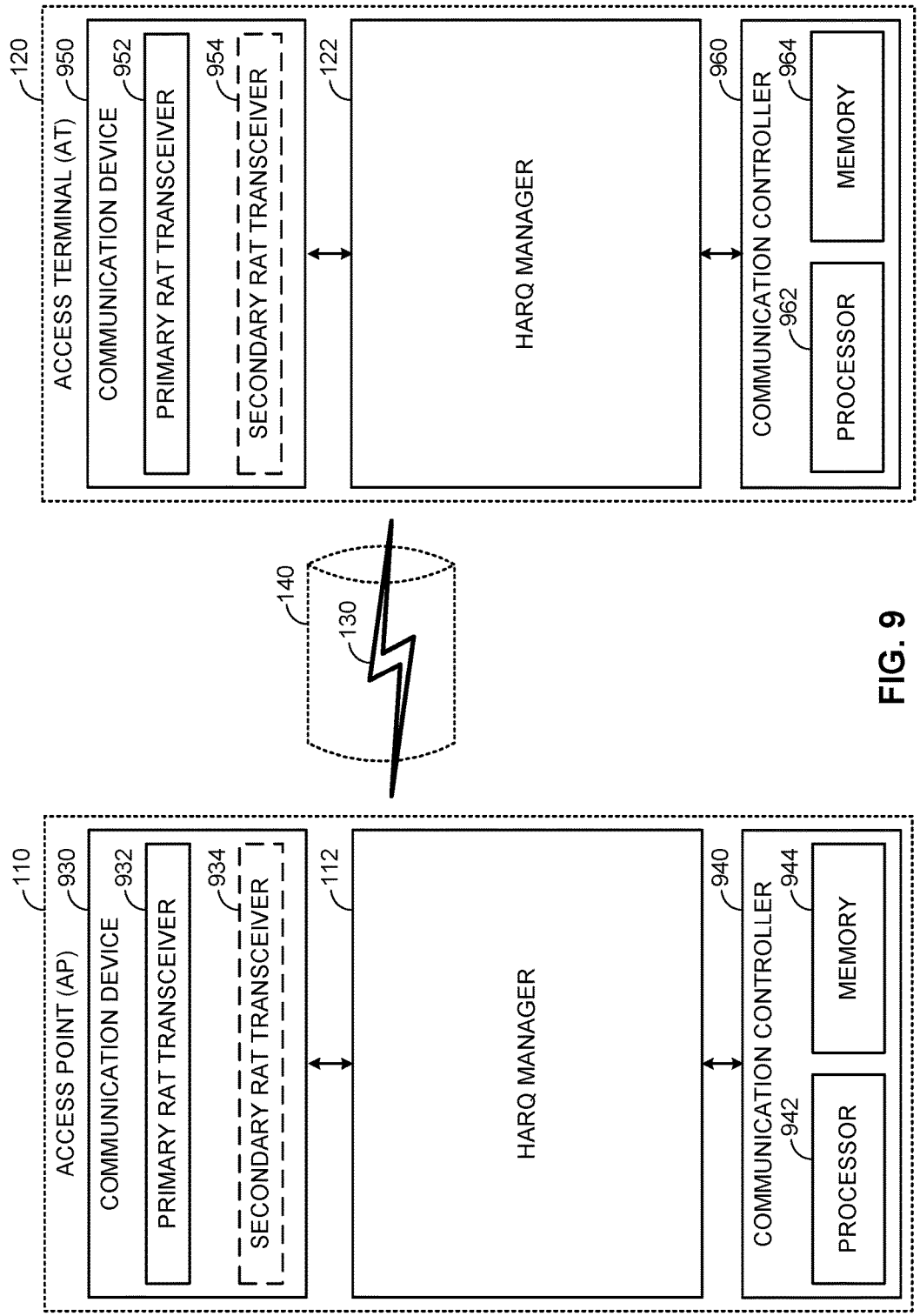
FIG. 9 is a device-level diagram illustrating example components of an access point and an access terminal in more detail according to at least one aspect of the disclosure.

FIG. 9 is a device-level diagram illustrating example components of the access point 110 and the access terminal 120 of the primary RAT system 100 in more detail. As shown, the access point 110 and the access terminal 120 may each generally include a wireless communication device (represented by the communication devices 930 and 950) for communicating with other wireless nodes via at least one designated RAT. The communication devices 930 and 950 may be variously configured for transmitting and encoding signals, and, conversely, for receiving and decoding signals in accordance with the designated RAT (e.g., messages, indications, information, pilots, and so on).

The communication devices 930 and 950 may include, for example, one or more transceivers, such as respective primary RAT transceivers 932 and 952, and, in some designs, (optional) co-located secondary RAT transceivers 934 and 954, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 940 and 960) for controlling operation of their respective communication devices 930 and 950 (e.g., directing, modifying, enabling, disabling, etc.). The communication controllers 940 and 960 may include one or more processors 942 and 962, and one or more memories 944 and 964 coupled to the processors 942 and 962, respectively. The memories 944 and 964 may be configured to store data, instructions, or a combination thereof, either as on-board cache memory, as separate components, a combination, etc. The processors 942 and 962 and the memories 944 and 964 may be standalone communication components or may be part of the respective host system functionality of the access point 110 and the access terminal 120.

It will be appreciated that the HARQ manager 112 and the HARQ manager 122 may be implemented in different ways. In some designs, some or all of the functionality associated therewith may be implemented by or otherwise at the direction of at least one processor (e.g., one or more of the processors 942 and/or one or more of the processors 962) and at least one memory (e.g., one or more of the memories 944 and/or one or more of the memories 964). In other designs, some or all of the functionality associated therewith may be implemented as a series of interrelated functional modules.

Figure 10:
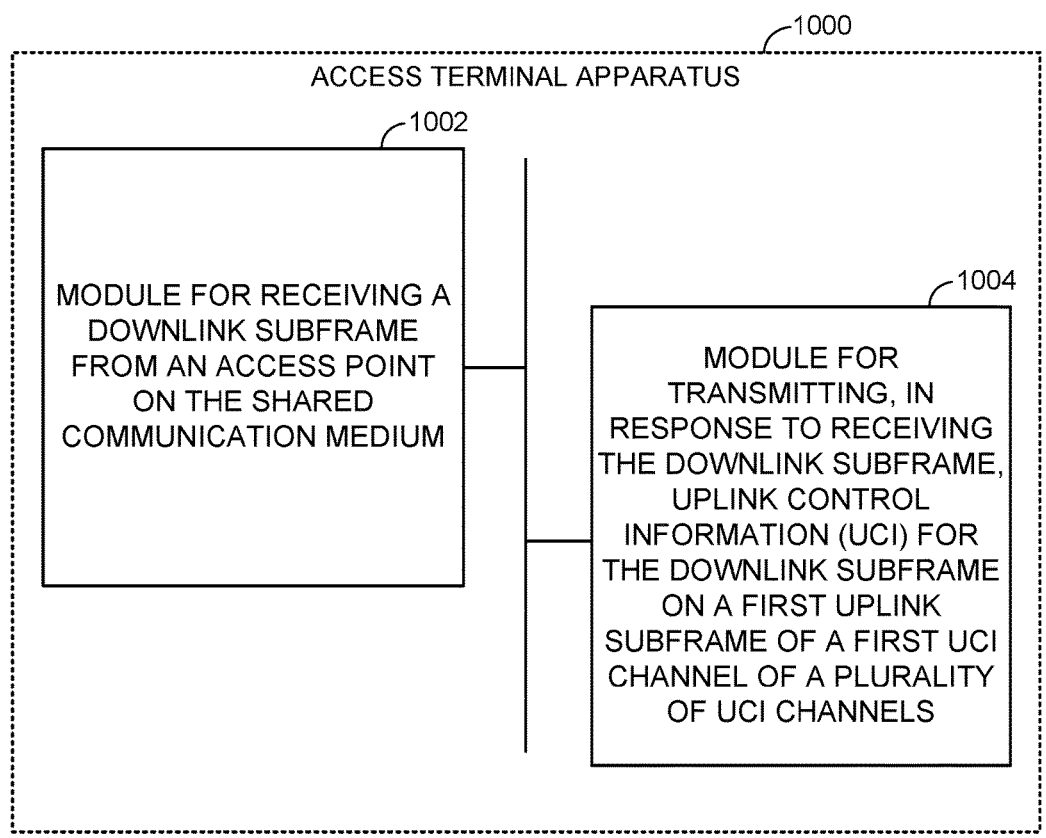
FIG. 10 illustrates an example apparatus represented as a series of interrelated functional modules according to at least one aspect of the disclosure.

FIG. 10 illustrates an example access terminal apparatus for implementing the HARQ manager 112 and the HARQ manager 122 represented as a series of interrelated functional modules. In the illustrated example, the apparatus 1000 includes a module for receiving 1002 and a module for transmitting 1004. The module for receiving 1002 may be configured to receive a downlink subframe from an access point on the shared communication medium. The module for transmitting 1004 may be configured to transmit in response to receiving the downlink subframe, uplink control information (UCI) for the downlink subframe on a first uplink subframe of a first UCI channel of a plurality of UCI channels.

The functionality of the modules of FIG. 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 8 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

The invention claimed is:

1. A method of communicating on a shared communication medium, comprising:
   receiving, at an access terminal, a downlink subframe from an access point on the shared communication medium;
   in response to receiving the downlink subframe, transmitting, by the access terminal, uplink control information (UCI) for the downlink subframe on a first uplink subframe of a first UCI channel of a plurality of UCI channels; and
   in response to receiving the downlink subframe, transmitting, by the access terminal, the UCI on a second uplink subframe of a second UCI channel of the plurality of UCI channels, wherein the UCI is transmitted on the second uplink subframe of the second UCI channel only before expiration of a configured time duration.

2. The method of claim 1, wherein the first UCI channel is a first available UCI channel of the plurality of UCI channels.

3. The method of claim 1, wherein the access terminal is configured to transmit all UCI for all received downlink frames on the first UCI channel, regardless of availability of other UCI channels of the plurality of UCI channels.

4. The method of claim 1, wherein the access terminal does not repeat transmission of the UCI on another channel of the plurality of UCI channels after the expiration of the configured time duration.

5. The method of claim 1, wherein the configured time duration is configured by the access point.

6. The method of claim 1, wherein the access terminal selects the first UCI channel without input from the access point based on characteristics of the plurality of UCI channels.

7. The method of claim 6, wherein the characteristics of the plurality of UCI channels include payload capabilities of the plurality of UCI channels, interference on the plurality of UCI channels, link budget conditions of the plurality of UCI channels, or any combination thereof.

8. The method of claim 1, wherein the UCI is contained in a UCI payload, and wherein the UCI payload contains UCI for multiple downlink subframes.

9. The method of claim 8, wherein uplink resources on the first UCI channel are allocated semi-statically to the access terminal.

10. The method of claim 8, wherein uplink resources on the first UCI channel are dynamically allocated in the downlink subframe.

11. The method of claim 10, wherein the dynamic allocation of the uplink resources indicates:
    a first grant-based uplink resource and a second grant-based uplink resource in the downlink subframe,
    the first grant-based uplink resource and the second grant-based uplink resource semi-statically,
    the first grant-based uplink resource in the downlink subframe and the second grant-based uplink resource semi-statically, or
    the second grant-based uplink resource in the downlink subframe and the first grant-based uplink resource semi-statically.

12. An apparatus for communicating on a shared communication medium, comprising:
    a transceiver of an access terminal configured to receive a downlink subframe from an access point on the shared communication medium;
    at least one processor of the access terminal configured to cause the transceiver to transmit, in response to reception of the downlink subframe, uplink control information (UCI) for the downlink subframe on a first uplink subframe of a first UCI channel of a plurality of UCI channels; and
    cause the transceiver to transmit, in response to reception of the downlink subframe, the UCI on a second uplink subframe of a second UCI channel of the plurality of UCI channels, wherein the UCI is transmitted on the second uplink subframe of the second UCI channel only before expiration of a configured time duration.

13. The apparatus of claim 12, wherein the first UCI channel is a first available UCI channel of the plurality of UCI channels.

14. The apparatus of claim 12, wherein the access terminal is configured to transmit all UCI for all received downlink frames on the first UCI channel, regardless of availability of other UCI channels of the plurality of UCI channels.

15. The apparatus of claim 12, wherein the access terminal does not repeat transmission of the UCI on another channel of the plurality of UCI channels after the expiration of the configured time duration.

16. The apparatus of claim 12, wherein the configured time duration is configured by the access point.

17. The apparatus of claim 12, wherein the access terminal selects the first UCI channel without input from the access point based on characteristics of the plurality of UCI channels.

18. The apparatus of claim 17, wherein the characteristics of the plurality of UCI channels include payload capabilities of the plurality of UCI channels, interference on the plurality of UCI channels, link budget conditions of the plurality of UCI channels, or any combination thereof.

19. The apparatus of claim 12, wherein the UCI is contained in a UCI payload, and wherein the UCI payload contains UCI for multiple downlink subframes.

20. The apparatus of claim 19, wherein uplink resources on the first UCI channel are allocated semi-statically to the access terminal.

21. The apparatus of claim 19, wherein uplink resources on the first UCI channel are dynamically allocated in the downlink subframe.

22. The apparatus of claim 21, wherein the dynamic allocation of the uplink resources indicates:
    a first grant-based uplink resource and a second grant-based uplink resource in the downlink subframe,
    the first grant-based uplink resource and the second grant-based uplink resource semi-statically,
    the first grant-based uplink resource in the downlink subframe and the second grant-based uplink resource semi-statically, or
    the second grant-based uplink resource in the downlink subframe and the first grant-based uplink resource semi-statically.

23. An apparatus for communicating on a shared communication medium, comprising:
    a communication means of an access terminal configured to receive a downlink subframe from an access point on the shared communication medium; and
    a processing means of the access terminal configured to:
        cause the communication means to transmit, in response to reception of the downlink subframe, uplink control information (UCI) for the downlink subframe on a first uplink subframe of a first UCI channel of a plurality of UCI channels; and
        cause the communication means to transmit, in response to reception of the downlink subframe, the UCI on a second uplink subframe of a second UCI channel of the plurality of UCI channels, wherein the UCI is transmitted on the second uplink subframe of the second UCI channel only before expiration of a configured time duration.

24. A non-transitory computer-readable medium storing computer-executable instructions that when executed by at least one processor cause the at least one processor to perform functions related to communicating on a shared communication medium, the computer-executable instructions comprising:
    at least one instruction to cause an access terminal to receive a downlink subframe from an access point on the shared communication medium;
    at least one instruction to cause the access terminal to transmit, in response to reception of the downlink subframe, uplink control information (UCI) for the downlink subframe on a first uplink subframe of a first UCI channel of a plurality of UCI channels; and
    at least one instruction to cause the access terminal to transmit, in response to reception of the downlink subframe, the UCI on a second uplink subframe of a second UCI channel of the plurality of UCI channels, wherein the UCI is transmitted on the second uplink subframe of the second UCI channel only before expiration of a configured time duration.

* * * * *